Jan. 8, 1952 W. R. TRIPLETT 2,581,734
INSTRUMENT CASE AND COVER
Filed Jan. 11, 1950 2 SHEETS—SHEET 1

INVENTOR
WILLIAM R. TRIPLETT
By Toulmin & Toulmin
ATTORNEYS

Jan. 8, 1952 W. R. TRIPLETT 2,581,734
INSTRUMENT CASE AND COVER
Filed Jan. 11, 1950 2 SHEETS—SHEET 2
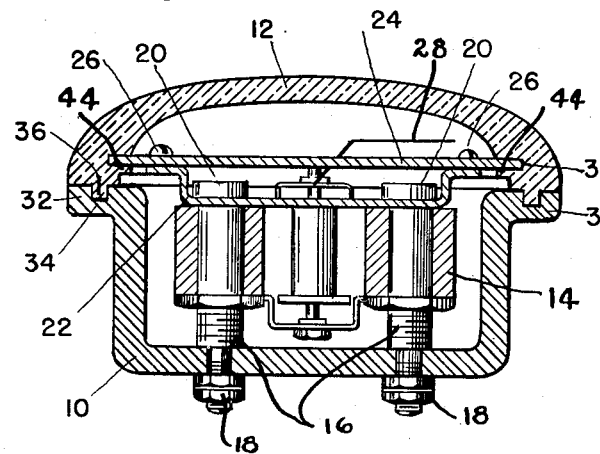
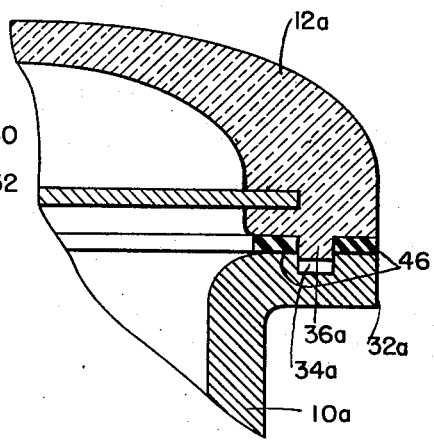
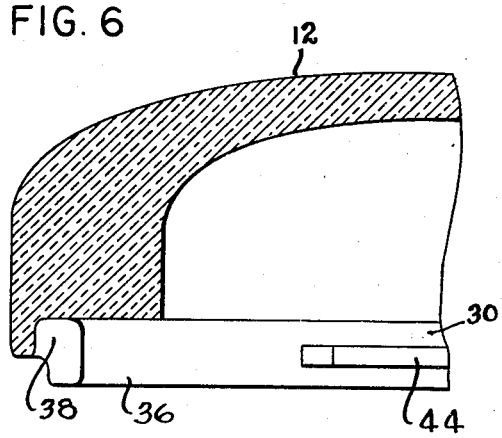
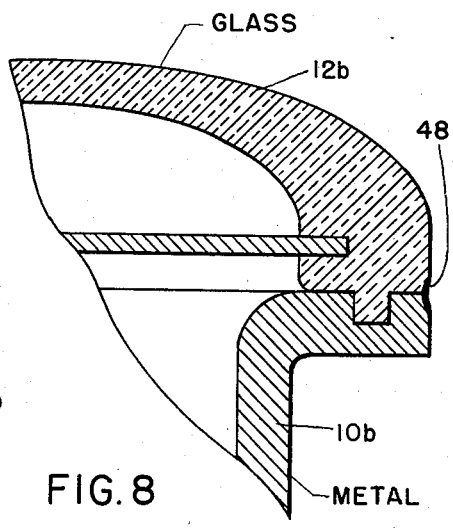
INVENTOR
WILLIAM R. TRIPLETT
By Toulmin & Toulmin
ATTORNEYS Patented Jan. 8, 1952

2,581,734

UNITED STATES PATENT OFFICE 2,581,734

INSTRUMENT CASE AND COVER

William R. Triplett, Bluffton, Ohio, assignor to The Triplett Electrical Instrument Company, Bluffton, Ohio, a corporation of Ohio Application January 11, 1950, Serial No. 137,950

6 Claims. (Cl. 73—431)

This instrument relates to instrument housings, particularly for indicating instruments, such as voltmeters, ammeters, and wattmeters.

Indicating instruments of the type with which the invention is concerned generally comprise a case portion in which the movement of the instrument is mounted and a transparent cover member of glass or plastic material through which the dial of the instrument can be observed.

Generally the cover glasses for such instruments are secured into position by separate bezels or snap rings or other separate members which require additional labor to assemble with the instrument case, as well as introducing a certain amount of expense. The necessary housing and retaining rings obscure the visibility of the instrument dial from the sides and limit the dial illumination from the room.

Ordinarily the cover glass is either mounted in the instrument case, or is mounted in a separate part which is attached to the instrument case by screws or other corresponding fastening means. In any event, instrument housings according to the prior art have been formed of several parts fastened together with a plurality of screws and the like and presenting ledges, recesses, and grooves which will collect dirt and which in some cases permit foreign material to get inside the instrument housing and possibly harm the instrument movement or impair its calibration, and limit the available scale length and visibility.

With the foregoing things in mind, the instant invention has as its primary object the provision of an instrument housing comprising a case and a cover therefor, such that these difficulties are eliminated.

Another object of this invention is to provide an instrument construction in which the fewest number of parts comprise the instrument housing.

It is also an object to provide a construction for the case of an indicating instrument such that a substantially longer scale can be employed than has been possible heretofore with the same case size.

A still further object of this invention is to provide a simplified construction for an instrument housing which can readily be hermetically sealed and is, in any event, an exceptionally dust-tight case.

A still further object of this invention is the provision of an instrument which reduces the material and labor expense in connection with the manufacture of the housing.

It is also an object of this invention to provide a construction for the housing of an indicating instrument such that there is greatly increased visibility of the instrument dial at all times, and better illumination thereof.

These and other objects and advantages will become more apparent upon reference to the following description taken in connection with the accompanying drawings, in which:

Figure 3 is a transverse longitudinal section through the instrument case and is indicated substantially by the cutting plane 3—3—3 on Figure 1;

Figure 5:
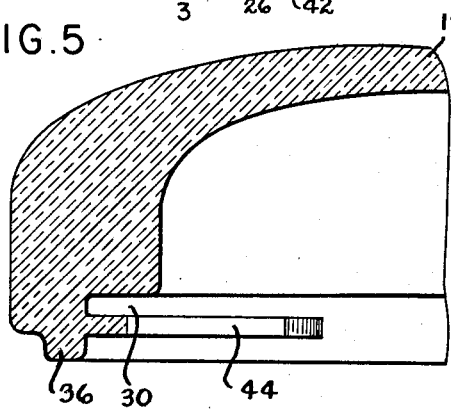
Figure 4:
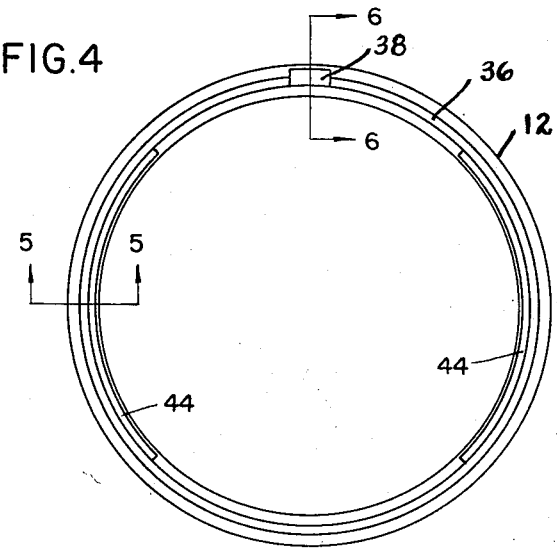
Figure 4 is a view looking at the inside of the improved cover member for the instrument case according to my invention.

Figures 5 and 6 are sectional views taken through the rim of the cover member as indicated by lines 5—5 and 6—6 on Figure 4;

Figure 7 is a fragmentary view taken through an assembled instrument case showing how gaskets can be placed between the cover and the instrument case for hermetically sealing the interior of the case; and Figure 8 is a view similar to Figure 7 but showing how a glass cover member can be sealed to a metallic instrument case as by soldering.

Referring to the drawings somewhat more in detail, the preferred form which an instrument construction according to my invention takes will best be seen in Figures 1 through 6.

In these figures it will be noted that the instrument housing comprises a relatively deep cup-like portion 10 which may be referred to as the "case," and a transparent cover portion 12. These two parts comprise the entire instrument housing. It will be understood that cover member 12 is preferably transparent over its entire surface for ease of manufacture and appearance, but that a portion only of this member could be transparent, and the remaining part translucent, if so desired.

Preferably member 12 is made of a plastic material, but may be glass if so desired. In a preferred embodiment, case 10 is made of insulating material such as a molded phenolic compound, but may, as will be seen hereinafter, be constructed of metal if desirable or necessary.

The movement of the instrument is generally indicated at 14 and is positioned within case 10. Movement 14 may comprise any of the types of movements employed for electrical instruments, such as the D'Arsonval moving coil type, the soft iron vane type, the electrodynamometer type, or any other sort of movement.

While it will be apparent as this description proceeds that the instrument housing of this invention is particularly useful in connection with electrical instruments, other types of indicating devices, such as pressure gages, vacuum gages, and so forth, could also be employed.

Movement 14, as illustrated, is a moving coil type movement and is mounted in case 10 as by the shouldered studs 16 which project through the bottom wall of case 10 to receive the clamping nuts 18. Studs 16 may extend through the iron of the movement on the front side of the said iron, and have heads 20 which clamp a bridge member 22 in position. Bridge member 22 is formed with upstanding end parts which underlie the dial 24 of the movement which is retained on the bridge by the dial screws 26.

Dial 24, of course, carries the scale for the instrument, and movement 14 comprises indicating pointer 28 that sweeps over the dial.

According to the present invention, the dial has its periphery extending into a groove 30 in the inner periphery of the cover member 12. By means of this engagement between the dial and the cover member, the cover member can be assembled with the dial after the latter has been mounted in position on the instrument movement, and then the entire assembly placed in the instrument case 10 with the studs projecting out the back of the case, and then the nuts 18 threaded onto the studs to draw the movement into its proper position, and in which position the dial 24 holds the cover member firmly against the turned out flange 32 extending around the periphery of the open side of the case.

For making the instrument housing substantially dust free, flange 32 preferably has a groove 34 therein into which extends tongue 36 of cover member 12. By this construction, substantially all foreign matter such as dust, moisture, and gases, are excluded from the instrument case.

It is to be preferred that the cover member 12 be retained on the instrument case so that it does not rotate, and to this end the cover member may have a recess 38 therein adapted for receiving a projection 40 upstanding from the face of flange 32 of case 10. By this expedient the cover member is held against circumferential movement of the case 10. At the same time, the interfitting tongue and groove prevent any movement of cover member 12 in the plane of the open side of the case.

Tongue and groove 34 and 36 have an additional benefit when a cover member is manufactured of a plastic material, particularly a thermoplastic material, in that this interengagement between the cover member and case prevents "cold flow" or "creep" of the cover member, thus preventing the said member from changing its shape or becoming loose from its assembled position.

Figure 1:
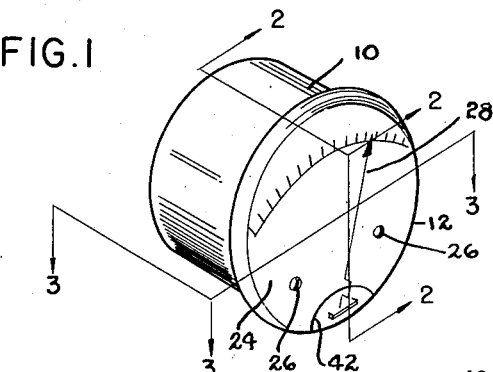
Figure 1 is a perspective view of a typical indicating instrument constructed according to my invention.
Figure 2:
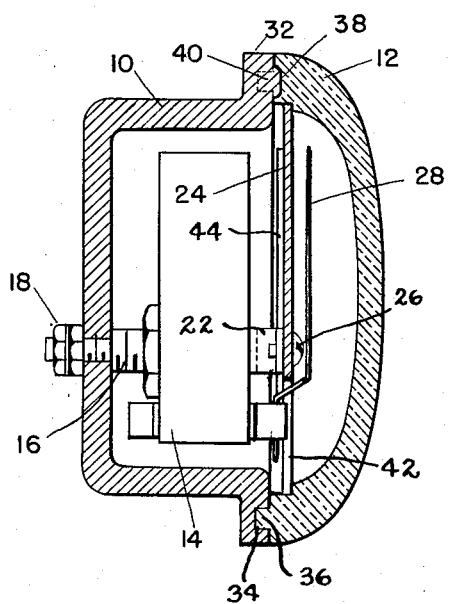
Figure 2 is a vertical longitudinal section taken through the instrument and is indicated by the cutting plane 2—2—2, on Figure 1.

As will be seen in Figures 1 and 2, dial 24 has a cut-out at one side, as at 42, which provides a space through which the base of pointer 28 extends in making connection with the instrument movement. This cut-out is utilized in facilitating the assembly of the dial and cover member with beneficial results. This comes about as follows:

The groove 30 extending around the inner periphery of cover member 12 is not continuous, but is interrupted at one or more points. In the particular cover member illustrated in the drawings, it will be seen, especially on reference to Figure 4, that the said groove is defined by a pair of spaced arcuate ribs 44 and that the ends of the said ribs are spaced apart a substantial amount.

Because of this arrangement the dial and cover member can be assembled by placing one edge of the dial in the groove formed by one of the ribs 44 and the cover member and dial rotated relatively. After one complete revolution, the dial will have engaged the groove defined by the other rib 44, and thus be in fully assembled relationship with the cover member. This manner of assembling the dial and cover member prevents the necessity for bending the dial or the cover member in order to snap them together and also permits the use of as deep a groove as is necessary for effecting a positive and secure engagement of the dial with the cover member.

Also, should it be necessary, the dial 24 can be made of relatively heavy material, thereby adding considerable strength to the assembly.

In certain instances it may be desirable to make the instrument other than round, as, for example, square, and in a case of this sort, the teachings of this invention could be practiced by providing grooves along the sides of the cover member into which the end of the dial could be slipped by relative reciprocatory movement between the movement and the cover member, rather than the rotary relative movement described above.

An instrument housing constructed according to my invention lends itself well to the manufacture of a hermetically sealed instrument, as will be seen in Figures 7 and 8. In Figure 7 the instrument cover 12a is placed on the instrument case 10a with gasket material therebetween, as at 46. The provision of the gasket material results in a tight sealing of the cover to the case when the instrument is drawn down into the case, as explained above.

It will be evident that the gasket material could be disposed, as illustrated, on opposite sides of tongue 36a, or that it could cover the entire mating area of the covering case or be confined to the groove 34a in flange 32a.

Turning now to Figure 8, there is shown an arrangement that results from the adaption of my invention to an instrument having a metallic housing, as at 10b, and a glass cover, as at 12b. In this case, a hermetic seal can be effected between the glass and metal by the application of solder thereto, the said glass being prepared in any of several well known manners for bonding to the applied solder.

From the foregoing, it will be evident that this invention provides an instrument housing having a number of advantages, among which are:

(1) Fewer number of parts.
(2) Simpler assembling.
(3) More visibility and better illumination for the dial.
(4) A longer dial, as much as twenty per cent, is possible.
(5) A construction ideally adapted for being hermetically sealed, and inherently highly dustproof at all times.
(6) An instrument housing devoid of ledges, grooves, and recesses, and so forth, which tend to collect dirt and which are difficult to clean.
(7) An instrument housing adapted for use in any situation now employing instrument housings and for substantially any type of indicating instrument.

It will be understood that the studs 16 could merely be supporting studs for the instrument, as shown, or could be employed as lead-in studs by introducing the proper insulation between the studs and the movement. Similarly, other studs for lead-ins could be mounted in the instrument without in any way departing from the teachings of this invention.

Also, in the case of the hermetically sealed housings, any studs extending through the back of the instrument case could be sealed in any of several well known manners. The studs in connection with the metal case of Figure 8 would also be insulated therefrom, in addition to being sealed.

The type of instrument case illustrated in the drawings and particularly described in the specification is the more conventional type encountered in connection with panel and switchboard instruments. However, it is also possible to practice the teachings of this invention with that type of instrument which has a substantially flat support member on which the movement is mounted and a cup-shaped transparent cover member that fits over and about the assembly of the movement and its support plate. It will be evident that this type of instrument construction can also be manufactured in accordance with the teachings of this invention.

It will be understood that this invention is susceptible to modification in order to adapt it to different usages and conditions, and, accordingly, it is desired to comprehend such modifications within this invention as may fall within the scope of the appended claims.

I claim:

1. In a housing for an indicating instrument: a cup-shaped case, an instrument movement mounted in and supported by said case and comprising a dial adjacent the open side of said case, a transparent cover member on the open side of said case including an axially extending cylindrical portion that surrounds said dial, and a projection about the inner periphery of said cover member engaging underneath the edge of said dial, whereby said dial supports said cover member on said case.

2. In a housing for an indicating instrument or the like; a cup-shaped case, a movement mounted in and supported by said case comprising a dial adjacent the open side of the case, a dish-shaped transparent cover member mounted on the open side of said case with its convex side outwardly and including an axially extending cylindrical part that surrounds said dial, and a projection extending around at least part of the inner periphery of said cover member engaging underneath the edge of said dial, whereby the dial supports the said cover member in position on said case.

3. In a housing for an indicating instrument: a cup-shaped case, an instrument movement mounted in and supported by said case and comprising a dial adjacent the open side of said case, a transparent cover member on the open side of said case, the inner periphery of said cover member enclosing said dial, and projections about the inner periphery of said cover member beneath the edge of said dial, whereby said dial supports said cover member on said case, said cover member and case having mating surfaces and there being an interfitting tongue and groove extending peripherally about the said mating surfaces.

4. In a cover member for the housing of an indicating instrument or the like; a dish-shaped transparent member adapted for being mounted on the instrument housing with its convex side outwardly, said cover member having an annular shoulder on the inside spaced inwardly from the edge of the member on the concave side thereof, and spaced peripheral projections extending around the inner periphery of said cover member between said shoulder and said edge thereby forming recesses opening radially inwardly for engagement with the edge of a dial for supporting the cover member on the dial, said projections and recesses extending only part way around the inner periphery of the cover member to permit the introduction into said recesses of the edge of the dial by relative rotation between the cover member and dial.

5. In a cover member for the housing of an indicating instrument or the like: a dish-shaped transparent member adapted for being mounted on the instrument housing with its convex side outwardly, and a peripheral shoulder extending around the inner periphery of said cover member spaced inwardly from the edge of the member, peripheral projections on the inner periphery of said cover member spaced from said shoulder to form arcuate recesses opening radially inwardly for engagement with the edge of a dial for supporting the cover member on the dial, said projections extending only part way around the inner periphery of the cover member to permit the introduction into said recesses of the edge of the dial by relative rotation between the cover member and dial, and said cover member having a groove around the edge thereof opening toward the concave side of the cover member.

6. In a housing for an indicating instrument: a cup-shaped case, an instrument movement mounted in and supported by said case comprising a dial adjacent the open side of the case, a transparent cover member engaging the open side of said case and including a shouldered cylindrical recess on the side thereon toward the dial which encloses the periphery of the dial and engages the edge of the dial toward the said cover member, and a projection about the inner periphery of said cover member engaging the underneath side of the edge of the dial on the side thereof opposite said shoulder, whereby the said dial supports the cover member on said case, said projection being interrupted at at least one point about the periphery of said cover member, and said dial being formed with a notch at at least one point thereabout of a size to accommodate said projection.

WILLIAM R. TRIPLETT.

REFERENCES CITED

The following references are of record in the file of this patent:

UNITED STATES PATENTS

| Number | Name | Date |
|---|---|---|
| 1,226,810 | Redfield et al. | May 22, 1917 |
| 1,838,962 | Schlaich | Dec. 29, 1931 |
| 1,911,099 | White et al. | May 23, 1933 |
| 2,099,958 | Herold et al. | Nov. 23, 1937 |
| 2,166,003 | Green | July 11, 1939 |
| 2,206,437 | Tracy | July 2, 1940 |
| 2,222,911 | Morf | Nov. 26, 1940 |
| 2,320,946 | Madden | June 1, 1943 |
| 2,346,495 | Lingel | Apr. 11, 1944 |
| 2,379,861 | Browne et al. | July 10, 1945 |
| 2,402,360 | Bevins | June 18, 1946 |
| 2,540,583 | Ives | Feb. 6, 1951 |